United States Patent
Lee et al.

(10) Patent No.: US 12,462,879 B2
(45) Date of Patent: Nov. 4, 2025

(54) MEMORY DEVICE AND OPERATING METHOD OF THE MEMORY DEVICE

(71) Applicant: SK hynix Inc., Icheon-si Gyeonggi-do (KR)

(72) Inventors: Dong Uk Lee, Icheon-si Gyeonggi-do (KR); Yun Cheol Kim, Icheon-si Gyeonggi-do (KR); Hae Chang Yang, Icheon-si Gyeonggi-do (KR)

(73) Assignee: SK hynix Inc., Icheon-si Gyeonggi-do (KR)

( * ) Notice: Subject to any disclaimer, the term of this patent is extended or adjusted under 35 U.S.C. 154(b) by 327 days.

(21) Appl. No.: 18/296,789

(22) Filed: Apr. 6, 2023

(65) Prior Publication Data
US 2024/0127892 A1    Apr. 18, 2024

(30) Foreign Application Priority Data
Oct. 14, 2022   (KR) .......................... 10-2022-0132326

(51) Int. Cl.
  G11C 16/16   (2006.01)
  G11C 16/10   (2006.01)
  G11C 16/34   (2006.01)

(52) U.S. Cl.
  CPC ............ G11C 16/16 (2013.01); G11C 16/102 (2013.01); G11C 16/3495 (2013.01)

(58) Field of Classification Search
  CPC ...................................................... G11C 16/16
  USPC .................................................... 365/189.11
  See application file for complete search history.

(56) References Cited

U.S. PATENT DOCUMENTS

| | | | |
|---|---|---|---|
| 9,583,201 B1 * | 2/2017 | Lee ...................... | G11C 16/10 |
| 10,964,398 B2 * | 3/2021 | Nam .................... | G11C 11/5635 |
| 11,664,075 B2 * | 5/2023 | Lien ...................... | G11C 16/102 |
| | | | 365/189.011 |

FOREIGN PATENT DOCUMENTS

| KR | 102016041 B1 | 8/2019 |
|---|---|---|
| KR | 102360211 B1 | 2/2022 |

OTHER PUBLICATIONS

Kirock Kwon et al., "An Advanced SLC-buffering for TLC NAND Flash-based Storage", IEEE Transactions on onsumer Electronics, vol. 63, No. 4, Nov. 2017, pp. 459-466.*

(Continued)

*Primary Examiner* — Muna A Techane
(74) *Attorney, Agent, or Firm* — WILLIAM PARK AND ASSOCIATES LTD.

(57) ABSTRACT

There are provided a memory device and an operating method of the memory device. The memory device includes: a memory block including a plurality of sub-blocks; a peripheral circuit for performing first program and erase operations in a first manner in a first sub-block, among the plurality of sub-blocks, and performing second program and erase operations in a second manner in a second sub-block, among the plurality of sub-blocks; and a control circuit configured to, when a cycling number of the second program and erase operations that are performed in the second sub-block is equal to or greater than a reference number, control the peripheral circuit to perform a compensation operation that compensates for a threshold voltage of memory cells included in the first sub-block.

22 Claims, 18 Drawing Sheets

(56) References Cited

OTHER PUBLICATIONS

Lei Yao et al., "TLC-FTL: Workload-aware Flash Translation Layer for TLC/SLC Dual-Mode Flash Memory in mbedded Systems", 2015 IEEE 17th International Conference on High Performance Computing and communications (HPCC), 2015 IEEE 7th International Symposium on Cyberspace Safety and Security (CSS), and 015 IEEE 12th.*

Ronnie Mativenga et al., "HyFAT: Affordable Hybrid Fast Address Translating Device Driver for Multichannel-3ased Flash Devices", IEEE Transactions On Consumer Electronics, vol. 65, No. 2, May 2019, pp. 142-149.*

Ingbiao Yao et al., "HDFTL: An On-Demand Flash Translation Layer Algorithm for Hybrid Solid State Drives", IEE! Ransactions On Consumer Electronics, vol. 67, No. 1, Feb. 2021, pp. 50-57.*

Kirock Kwon et al., "An Advanced SLC-buffering for TLC NAND Flash-based Storage", IEEE Transactions on Consumer Electronics, vol. 63, No. 4, Nov. 2017, pp. 459-466.

Lei Yao et al., "TLC-FTL: Workload-aware Flash Translation Layer for TLC/SLC Dual-Mode Flash Memory in Embedded Systems", 2015 IEEE 17th International Conference on High Performance Computing and Communications (HPCC), 2015 IEEE 7th International Symposium on Cyberspace Safety and Security (CSS), and 2015 IEEE 12th International Conference on Embedded Software and Systems (ICESS), 2015, pp. 831-834.

Ronnie Mativenga et al., "HyFAT: Affordable Hybrid Fast Address Translating Device Driver for Multichannel-Based Flash Devices", IEEE Transactions On Consumer Electronics, vol. 65, No. 2, May 2019, pp. 142-149.

Yingbiao Yao et al., "HDFTL: An On-Demand Flash Translation Layer Algorithm for Hybrid Solid State Drives", IEEE Transactions On Consumer Electronics, vol. 67, No. 1, Feb. 2021, pp. 50-57.

Yu-Heng Liu et al., "Triple-Level-Cell/Single-Level-Cell Mix-Mode Operation Induced Data Retention Degradation in 3-D Nand Flash Memories", IEEE Electron Device Letters, vol. 42, No. 12, Dec. 2021, pp. 1762-1765.

* cited by examiner

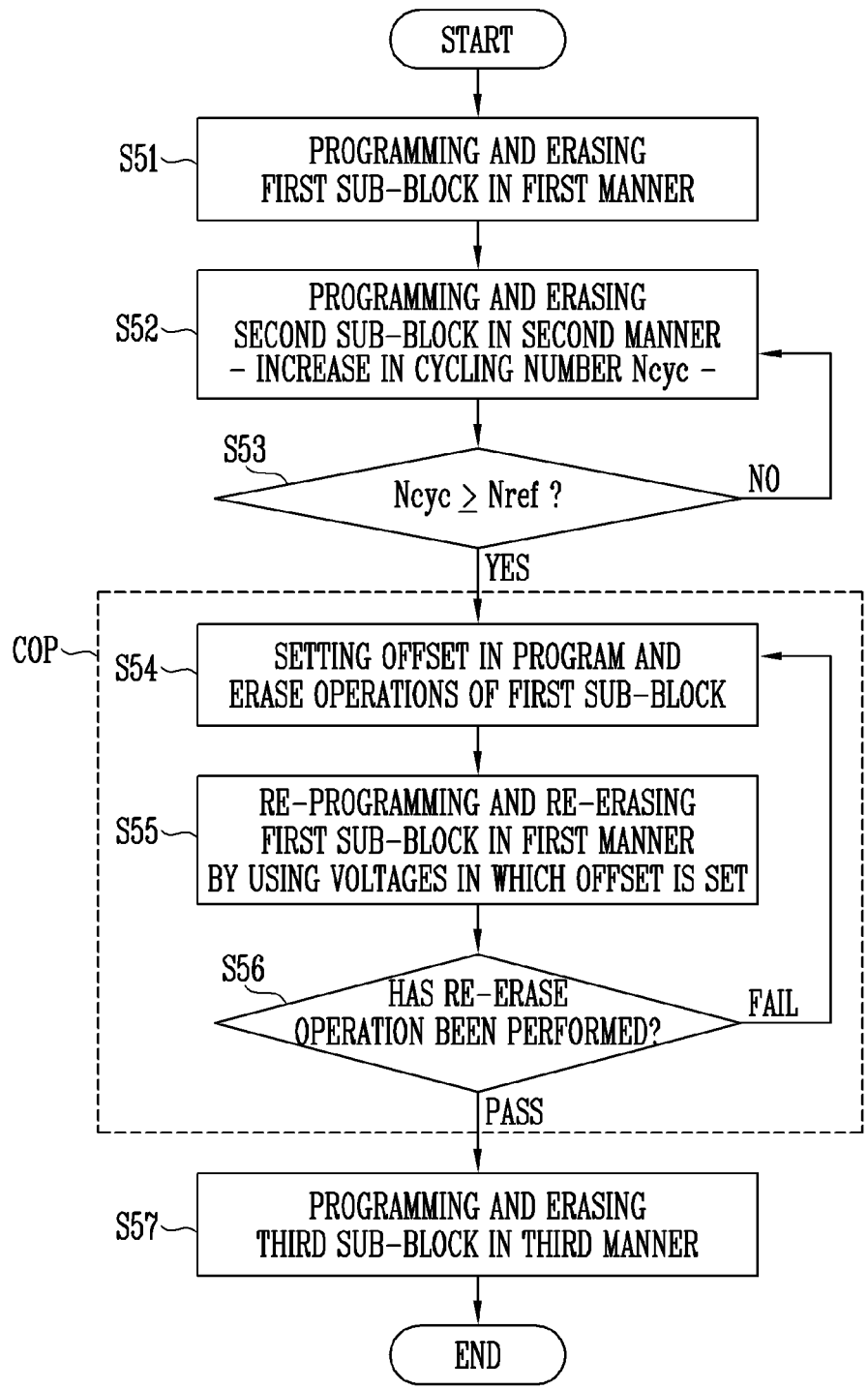

[PROGRAM OF STEP S51]

[PROGRAM OF STEP S55]

[ERASE OF STEP S51]

[ERASE OF STEP S55]

MEMORY DEVICE AND OPERATING METHOD OF THE MEMORY DEVICE

CROSS-REFERENCE TO RELATED APPLICATION

The present application claims priority under 35 U.S.C. § 119(a) to Korean patent application number 10-2022-0132326, filed on Oct. 14, 2022, in the Korean Intellectual Property Office, the entire disclosure of which is incorporated herein by reference.

BACKGROUND

1. Technical Field

The present disclosure generally relates to a memory device and an operating method of the memory device, and more particularly, to a memory device configured to perform a program or erase operation and an operating method of the memory device.

2. Related Art

A memory device may include a memory cell array in which data is stored, a peripheral circuit configured to perform a program, read or erase operation, and a control logic configured to control the peripheral circuit.

The memory cell array may include a plurality of memory blocks, and each of the plurality of memory blocks may include a plurality of strings. Each of the strings may include memory cells. In a memory device that is formed in a three-dimensional structure, strings may extend in a vertical direction on a substrate. Therefore, memory cells may be stacked in the vertical direction on the substrate.

Each of a plurality of memory blocks may include a plurality of sub-blocks. The plurality of sub-blocks may be programmed in different manners. For example, the plurality of sub-blocks may be programmed in a single level cell (SLC) manner, a multi-level cell (MLC) manner, a triple level cell (TLC) manner, a quad level cell (QLC) manner, or the like. When the plurality of sub-blocks are sequentially programmed in different manners, threshold voltages of memory cells included in some sub-blocks may be changed due to a difference between voltages that are used in program operations performed in different manners and a difference between threshold voltages of memory cells.

SUMMARY

In accordance with an aspect of the present disclosure, there is provided a memory device including: a memory block including a plurality of sub-blocks; a peripheral circuit configured to perform first program and erase operations in a first manner in a first sub-block, among the plurality of sub-blocks, and configured to perform second program and erase operations in a second manner in a second sub-block, among the plurality of sub-blocks; and a control circuit configured to, when a cycling number of the second program and erase operations that are performed in the second sub-block is equal to or greater than a reference number, control the peripheral circuit to perform a compensation operation that compensates for a threshold voltage of memory cells included in the first sub-block.

In accordance with another aspect of the present disclosure, there is provided a method of operating a memory device, the method including: performing a first program operation and a first erase operation in a first manner in a first sub-block included in a memory block; performing a second program operation and a second erase operation in a second manner in a second sub-block included in the memory block; comparing a cycling number of the second program operation and the second erase operation with a reference number; and performing a compensation operation that compensates for a threshold voltage of memory cells included in the first sub-block when the cycling number is equal to or greater than the reference number.

In accordance with still another aspect of the present disclosure, there is provided a memory device including: a memory block including a plurality of sub-blocks; a peripheral circuit configured to perform a first program operation in a first manner in a first sub-block, among the plurality of sub-blocks, and configured to perform a second program operation in a second manner in a second sub-block, among the plurality of sub-blocks; and a control circuit configured to, when a program number of the second program operation that is performed in the second sub-block is equal to or greater than a reference number, control the peripheral circuit to perform a compensation operation that compensates for a threshold voltage of memory cells included in the first sub-block operation that is performed.

In accordance with still another aspect of the present disclosure, there is provided a method of operating a memory device, the method including: performing a first program operation in a first manner in a first sub-block included in a memory block; performing a second program operation in a second manner in a second sub-block included in the memory block; comparing a program number of the second program operation that is performed in the second sub-block with a reference number; and performing a compensation operation that compensates for a threshold voltage of memory cells included in the first sub-block when the program number is equal to or greater than the reference number.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

Embodiments provide a memory device and an operating method of the memory device, which can improve reliability.

Figure 1:
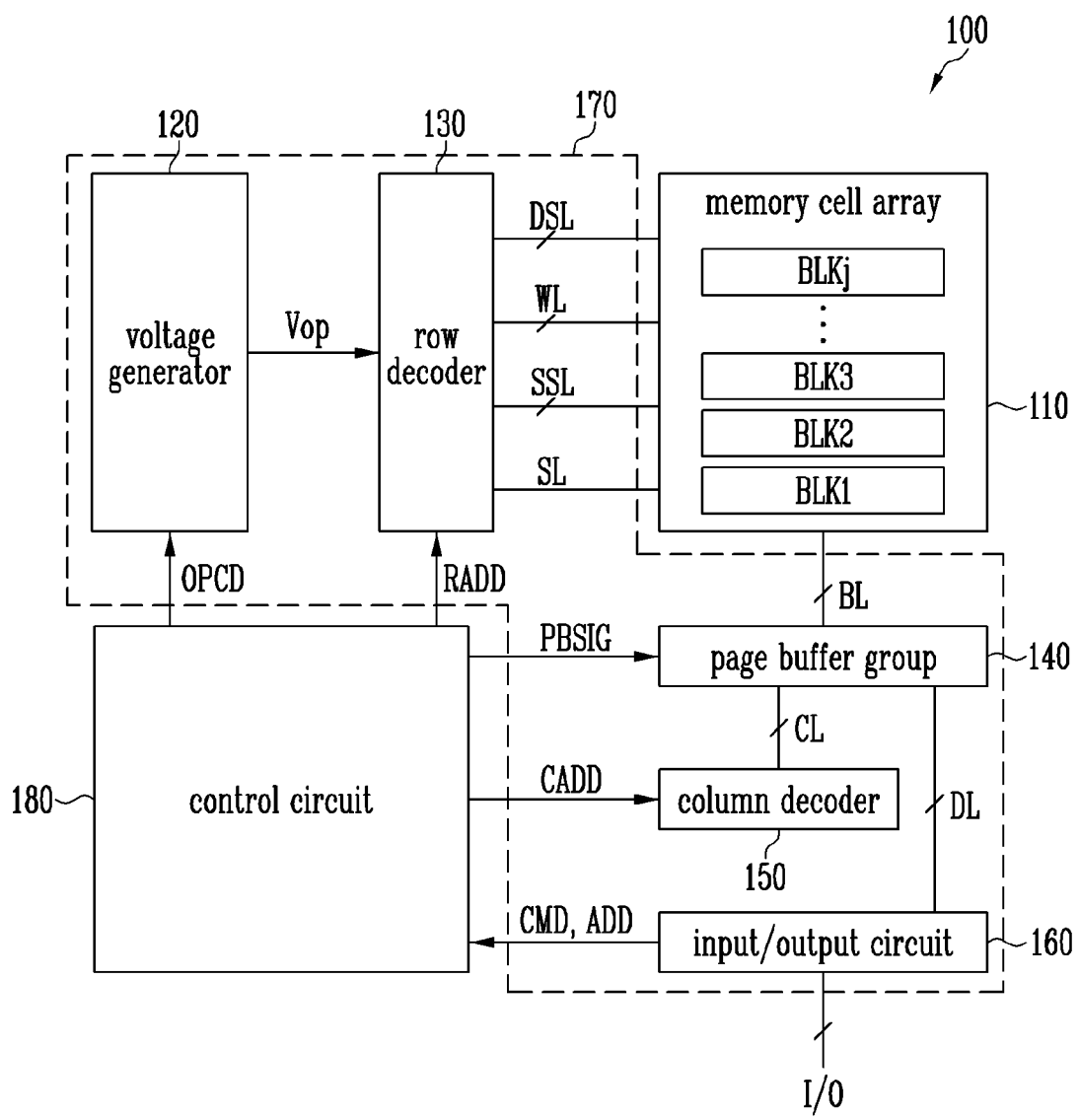

FIG. 1 is a diagram illustrating a memory device.

Figure 2:
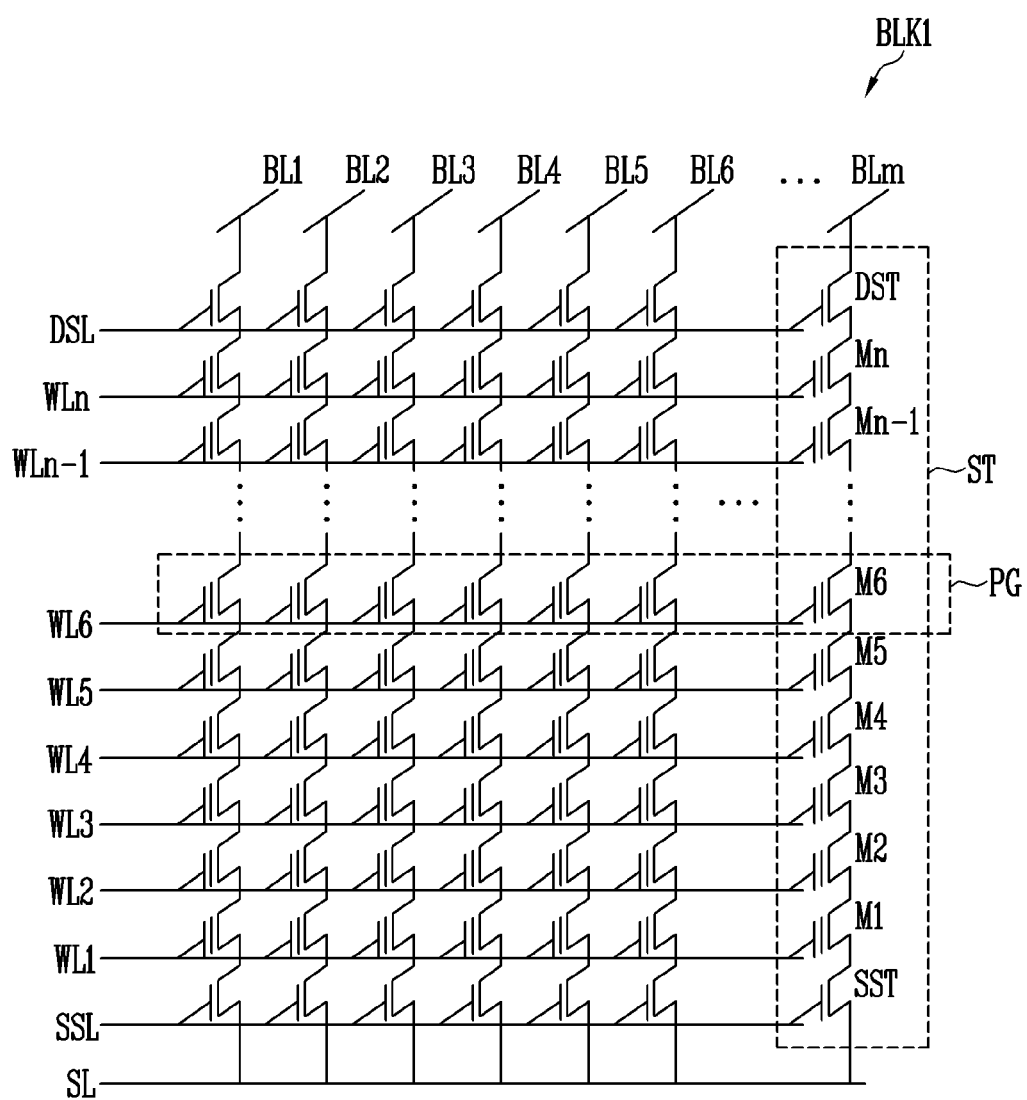

FIG. 2 is a circuit diagram illustrating any one memory block among memory blocks shown in FIG. 1.

Figure 3:
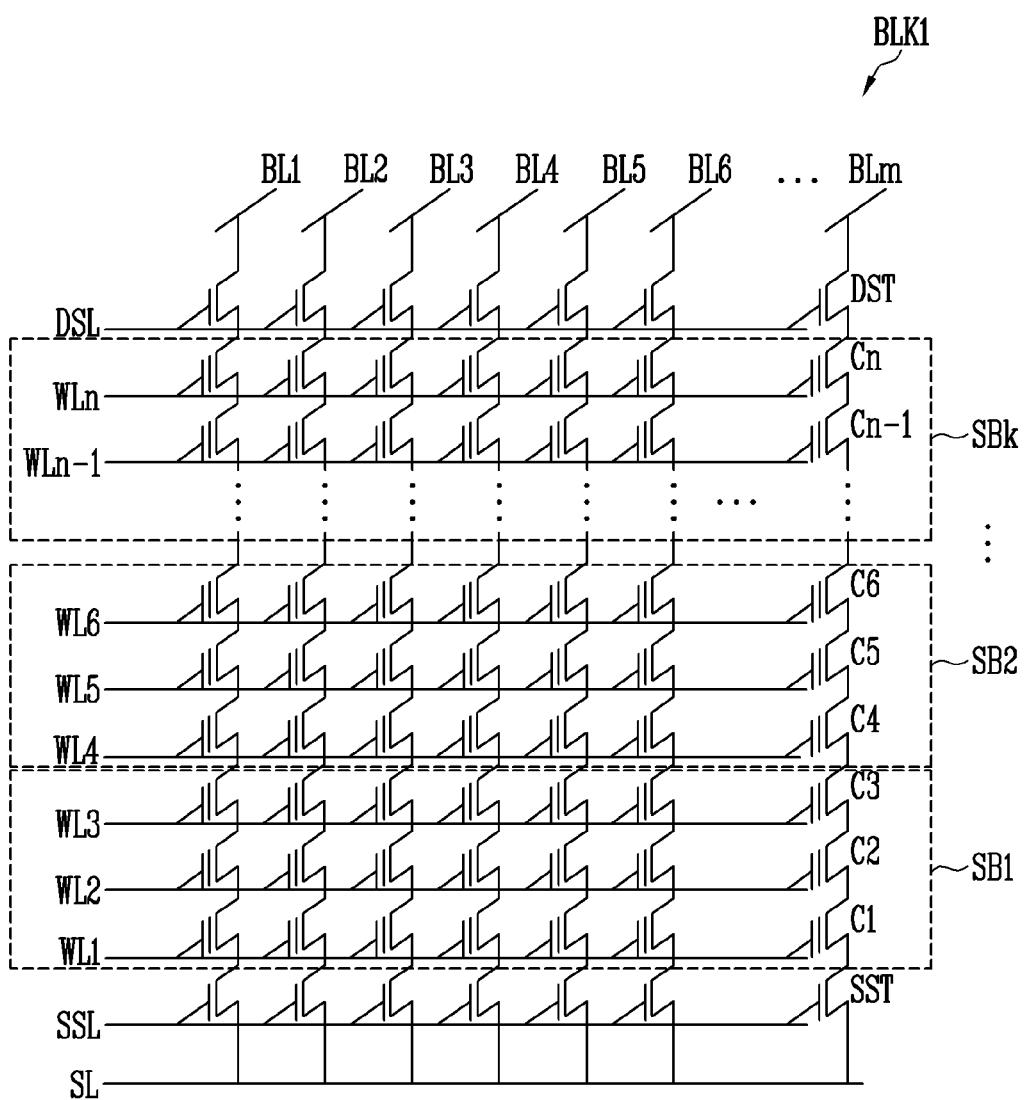

FIG. 3 is a diagram illustrating a memory block including sub-blocks.

Figure 4A:
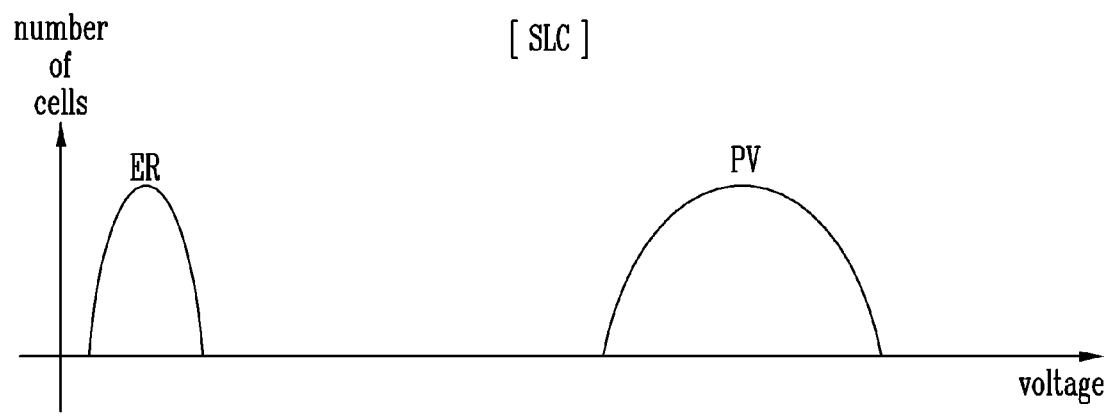
Figure 4B:
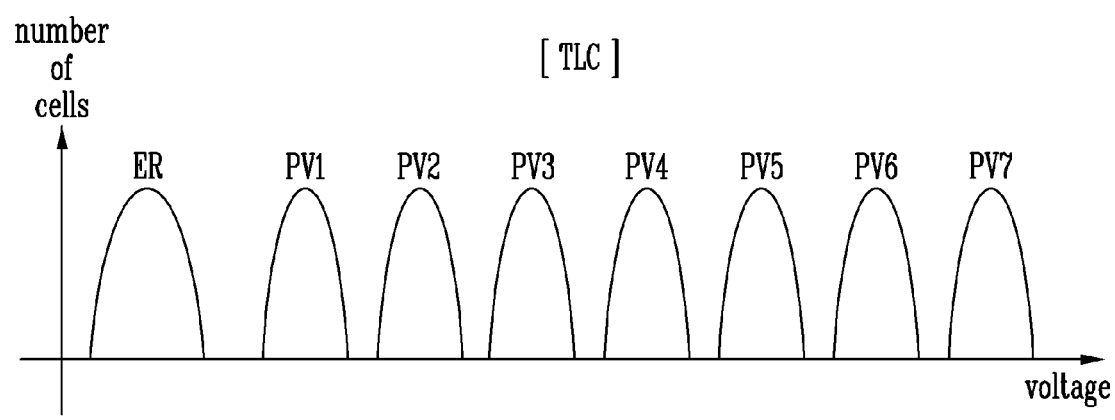
Figure 4C:
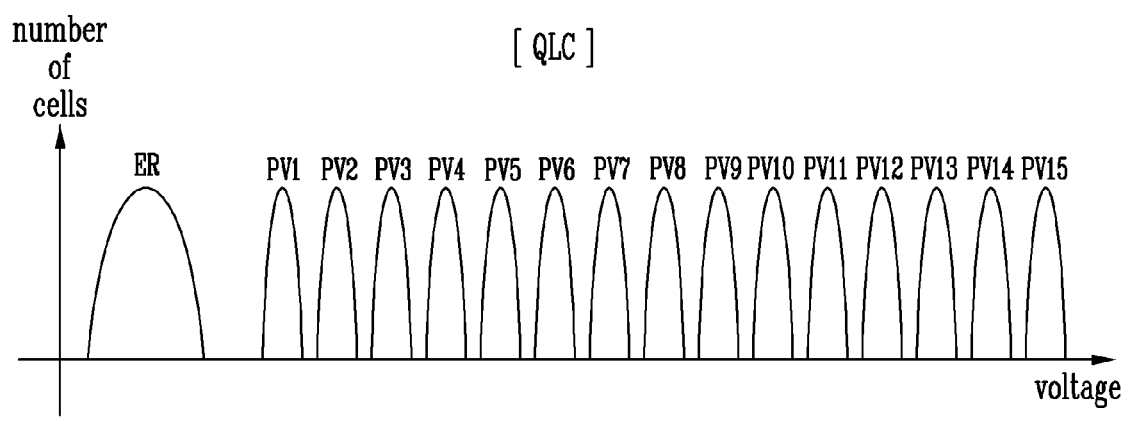

FIGS. 4A to 4C are diagrams illustrating threshold voltage distributions of memory cells programmed in different manners.

FIG. 5 is a flowchart illustrating an operating method of the memory device in accordance with a first embodiment of the present disclosure.

FIGS. 6A to 6D are diagrams illustrating sub-blocks programmed or erased in accordance with the first embodiment of the present disclosure.

Figure 7A:
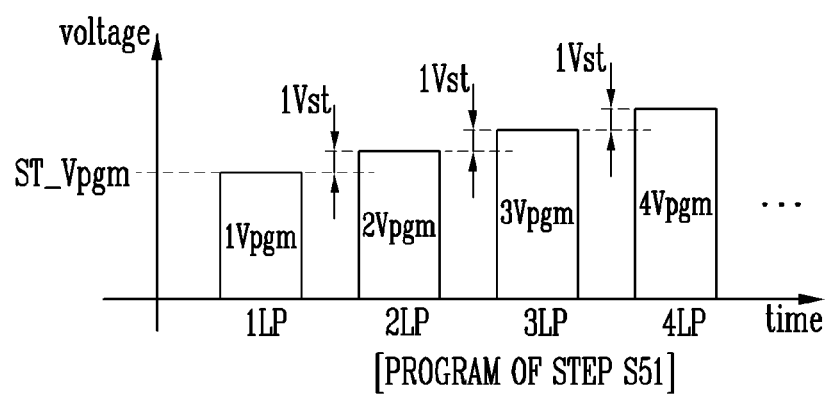
Figure 7B:
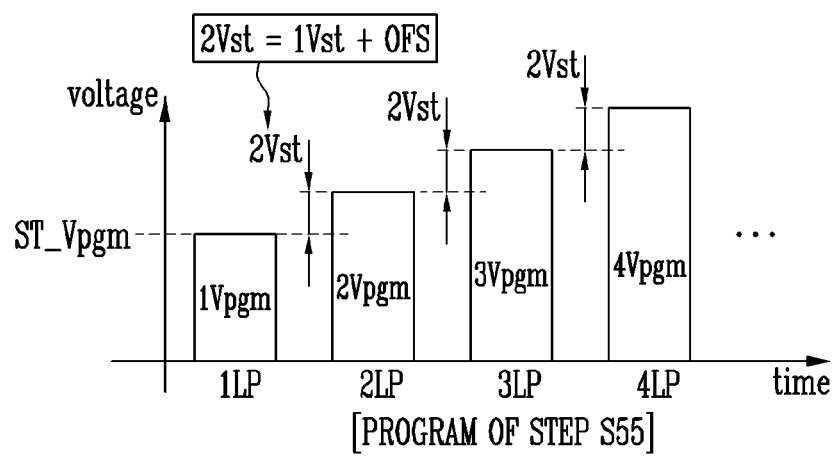
Figure 7C:
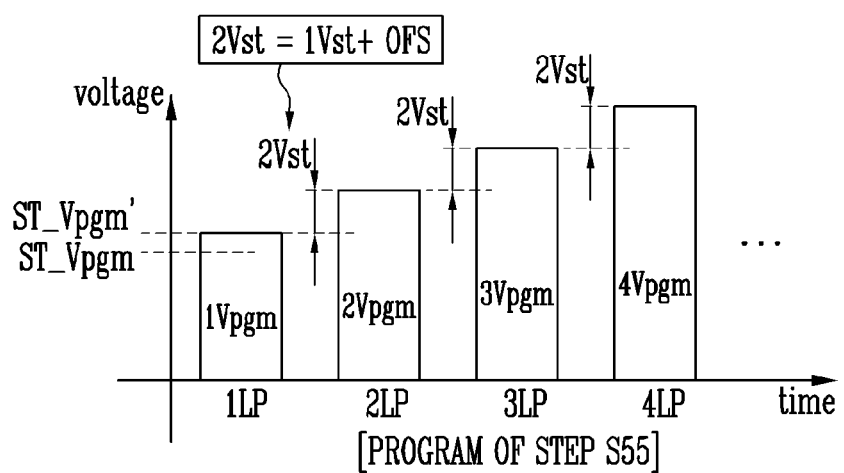

FIG. 7A to 7C are diagram illustrating program voltages before and after an offset is set.

Figure 8A:
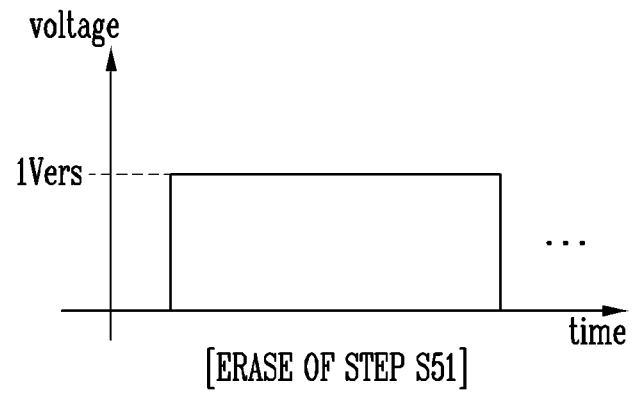
Figure 8B:
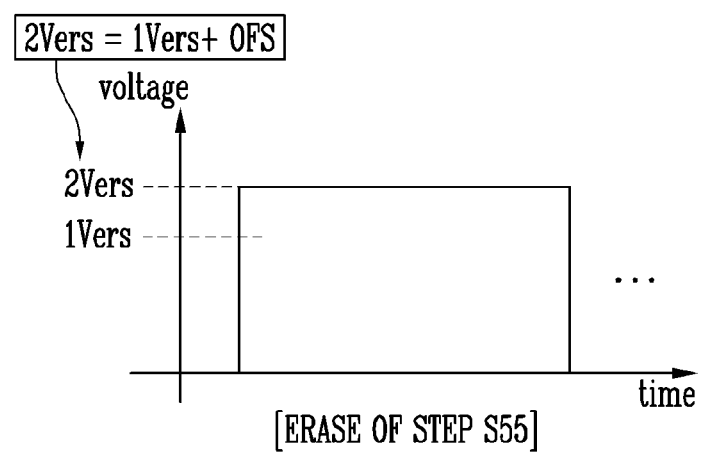

FIGS. 8A and 8B are diagram illustrating erase voltages before and after an offset is set.

Figure 9:
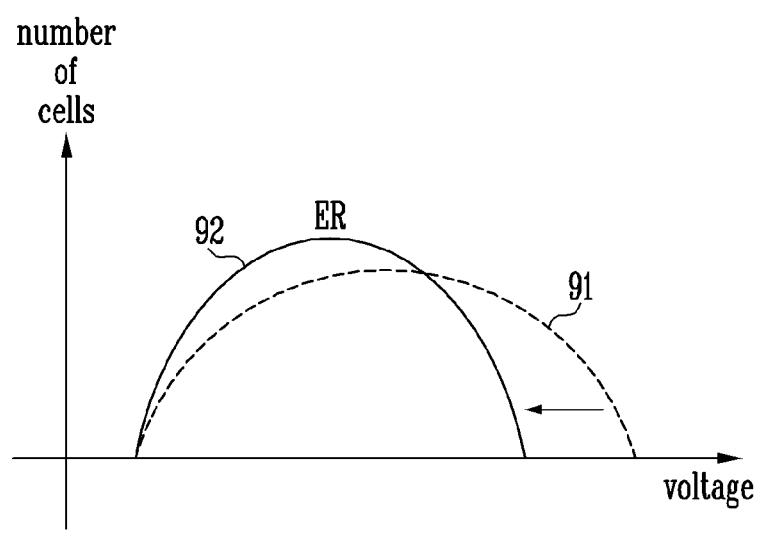

FIG. 9 is a diagram illustrating an effect in accordance with the first embodiment of the present disclosure.

Figure 10:
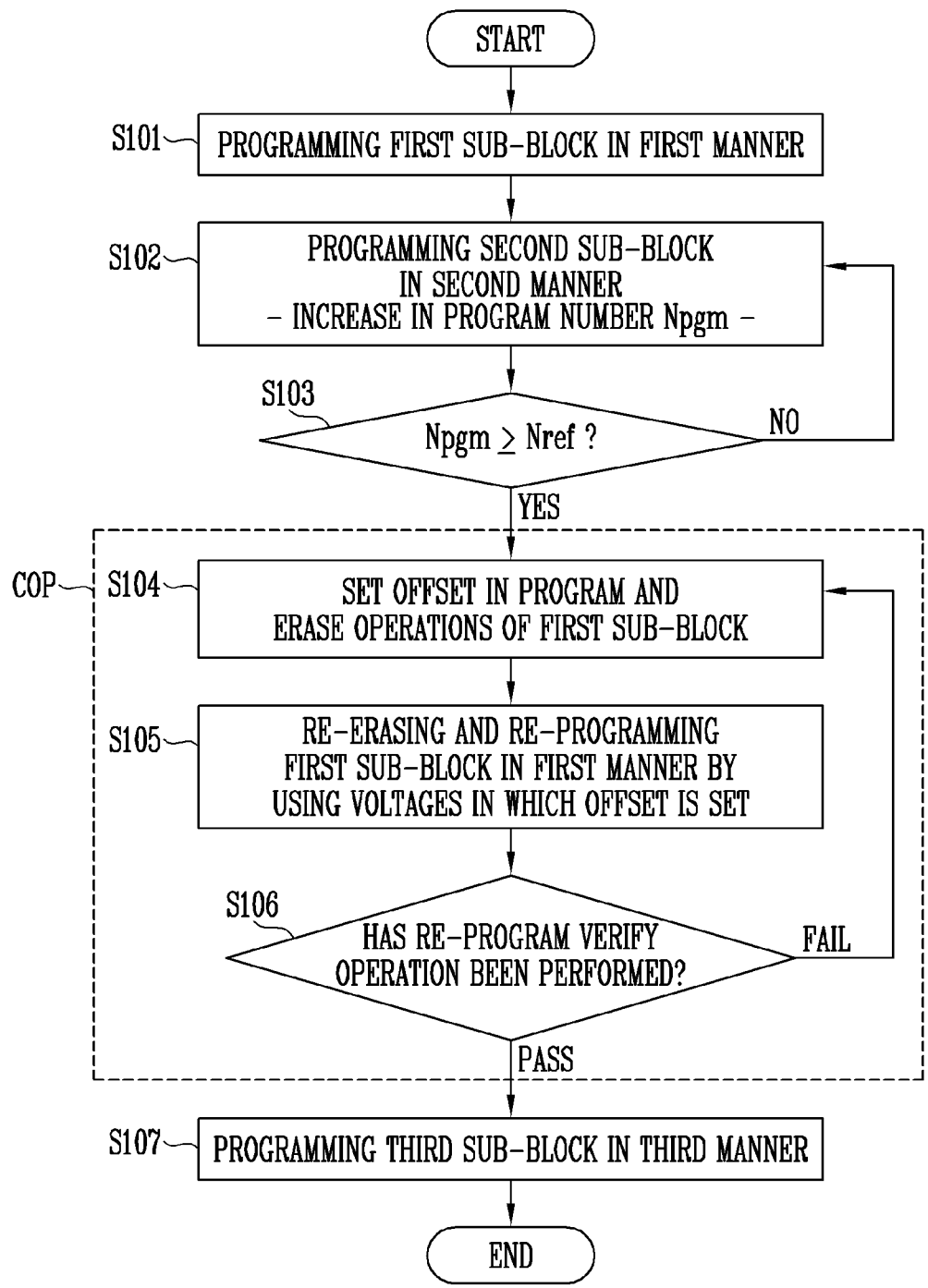

FIG. 10 is a flowchart illustrating an operating method of the memory device in accordance with a second embodiment of the present disclosure.

Figure 11:
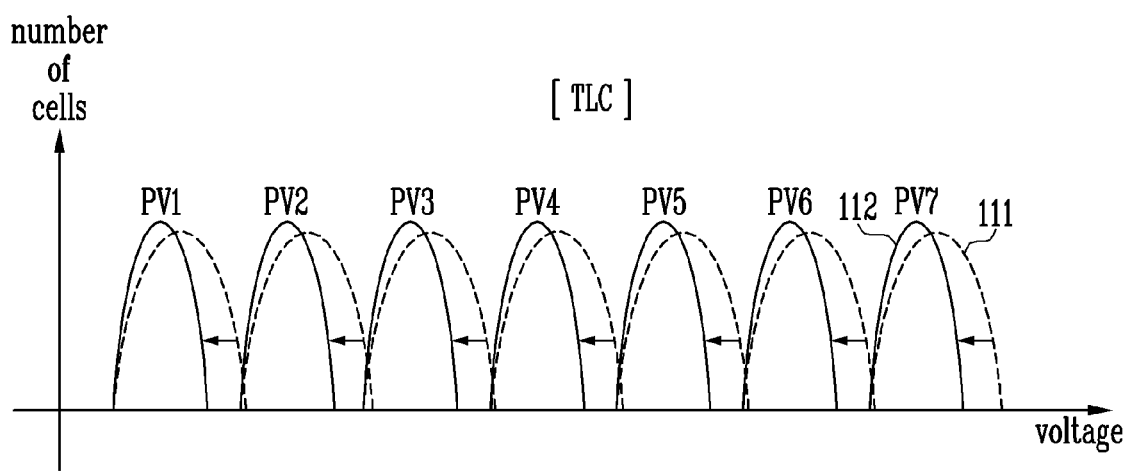

FIG. 11 is a diagram illustrating an effect in accordance with the second embodiment of the present disclosure.

Figure 12:
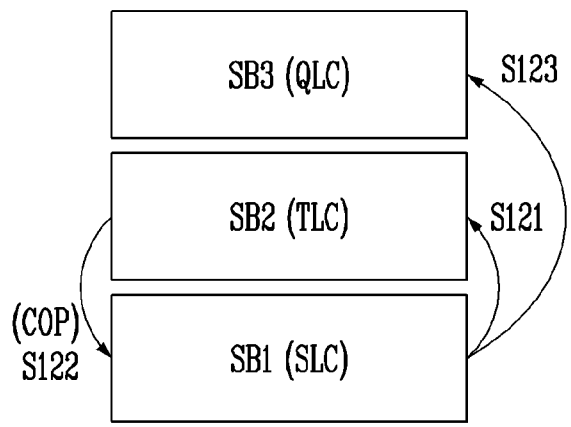

FIG. 12 is a flowchart illustrating an operating method of the memory device in accordance with a third embodiment of the present disclosure.

Figure 13:
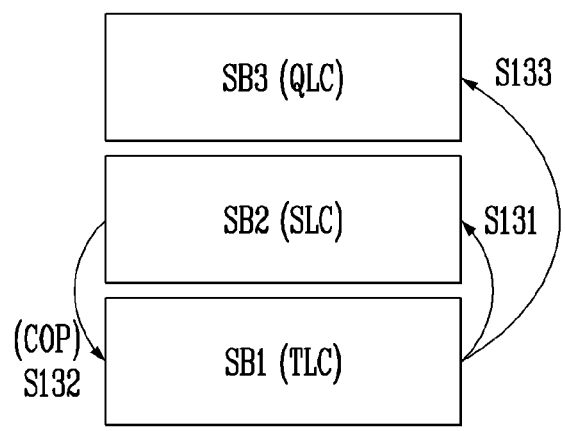

FIG. 13 is a flowchart illustrating an operating method of the memory device in accordance with a fourth embodiment of the present disclosure.

Figure 14:
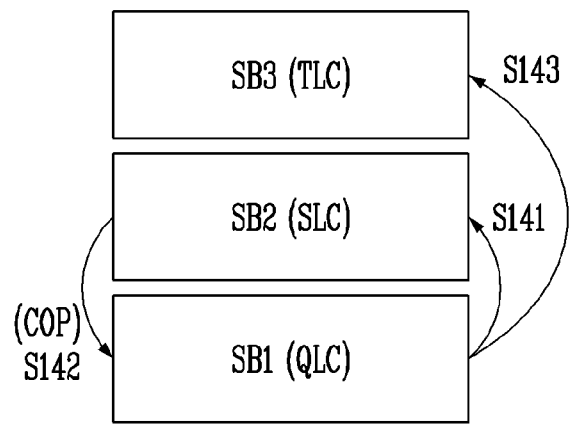

FIG. 14 is a flowchart illustrating an operating method of the memory device in accordance with a fifth embodiment of the present disclosure.

Figure 15:
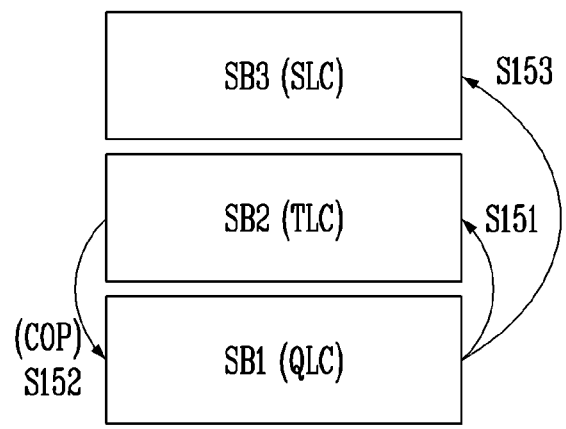

FIG. 15 is a flowchart illustrating an operating method of the memory device in accordance with a sixth embodiment of the present disclosure.

Figure 16:
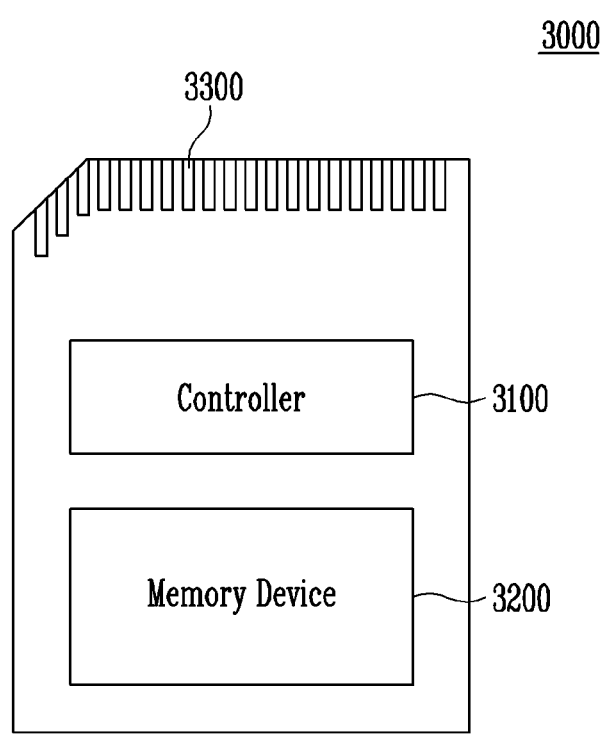

FIG. 16 is a diagram illustrating a memory card system to which the memory device of the present disclosure is applied.

Figure 17:
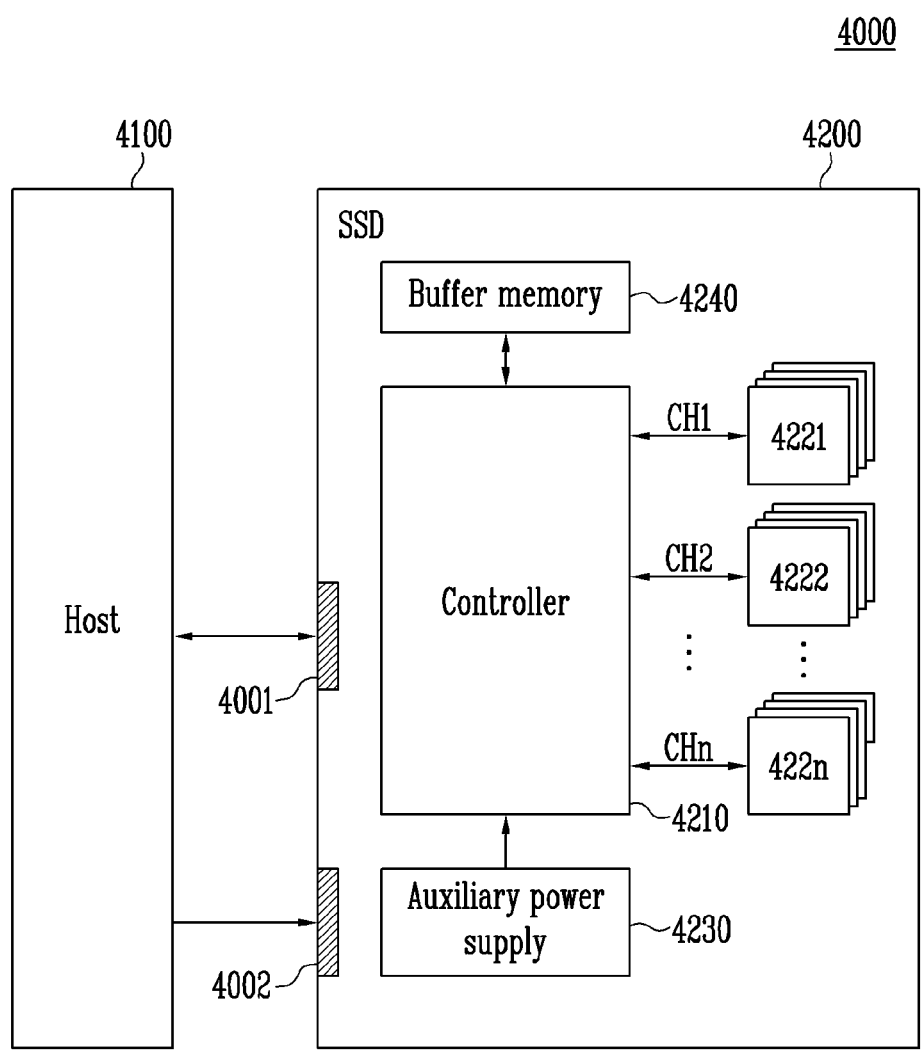

FIG. 17 is a diagram illustrating a Solid State Drive (SSD) system to which the memory device of the present disclosure is applied.

DETAILED DESCRIPTION

The specific structural and functional descriptions disclosed herein are merely illustrative for the purpose of describing embodiments according to the concept of the present disclosure. Additional embodiments according to the concept of the present disclosure can be implemented in various forms. Thus, the present disclosure should not be construed as limited to the embodiments set forth herein.

Hereinafter, it will be understood that, although the terms "first," "second," etc. may be used herein to describe various elements, these elements should not be limited by these terms. These terms are only used to distinguish one element from another element.

FIG. 1 is a diagram illustrating a memory device.

Referring to FIG. 1, the memory device 100 may include a memory cell array 110, a peripheral circuit 170, and a control circuit 180.

The memory cell array 110 may include first to jth memory blocks BLK1 to BLKj. The first to jth memory blocks BLK1 to BLKj may be formed in a three-dimensional structure. The first to jth memory blocks BLK1 to BLKj that are formed in the three-dimensional structure may include memory cells that are stacked in a vertical direction above a substrate.

The memory cells may store one-bit or two-or-more-bit data according to a program manner. For example, a manner in which one-bit data is stored in one memory cell may be referred to as a single level cell (SLC) manner, and a manner in which two-bit data is stored in one memory cells may be referred to as a multi-level cell (MLC) manner. A manner in which three-bit data is stored in one memory cell may be referred to as a triple level cell (TLC) manner, and a manner in which four-bit data is stored in one memory cell may be referred to as a quad level cell (QLC) manner. In addition, five-or-more-bit data may be stored in one memory cell.

The peripheral circuit 170 may be configured to perform a program operation for storing data, a read operation for outputting data stored in the memory cell array 110, and an erase operation for erasing data stored in the memory cell array 110. For example, the peripheral circuit 170 may include a voltage generator 120, a row decoder 130, a page buffer group 140, a column decoder 150, and an input/output circuit 160.

The voltage generator 120 may generate various operating voltages Vop that are used for a program operation, a read operation, or an erase operation in response to an operation code OPCD. For example, in response to the operation code OPCD, the voltage generator 120 may be configured to generate program voltages, pass voltages, turn-on voltages, turn-off voltages, a ground voltage, negative voltages, source voltages, verify voltages, read voltages, erase voltages, a precharge voltage, and the like.

The program voltages may be voltages that are applied to a selected word line among word lines WL in a program operation and may be used to increase a threshold voltage of memory cells that are connected to the selected word line.

The pass voltages may be voltages that are applied to unselected word lines, among the word lines WL, in a program or read operation and may be used to turn on memory cells that are connected to the unselected word lines. In accordance with this embodiment, in a read operation, the voltage generator 120 may adjust levels of the pass voltages according to a position of the selected word line.

The turn-on voltages may be voltages that are applied to drain select lines DSL or source select lines SSL and may be used to turn on drain select transistors or source select transistors. The turn-off voltages may be voltages that are applied to the drain select lines DSL or the source select lines SSL and may be used to turn off the drain select transistors or the source select transistors.

The ground voltage may be a voltage of 0V, and the negative voltages may be voltages lower than 0V. The source voltages may be voltages that are applied to a source line SL and may correspond to negative voltages, the ground voltage, or positive voltages.

The verify voltages may be voltages for deciding a threshold voltage of selected memory cells in a program or erase operation and may be applied to all word lines that are connected to a selected word line or a selected memory block. The read voltages may be voltages that are applied to a selected word line in a read operation and may be used to decide data stored in memory cells.

The erase voltages may be voltages that are applied to the source line SL in an erase operation and may be used to decrease a threshold of memory cells. The precharge voltage may be a positive voltage for precharging channels of unselected strings in a verify or read operation and may be supplied to the source line SL.

Since the voltage generator 120 generates the operating voltages Vop in response to the operation code OPCD, the voltage generator 120 may adjust levels of the operating voltages Vop and may adjust times at which the operating voltages Vop are output to the row decoder 130. The voltage generator 120 may set an offset in some voltages, among the operating voltages Vop, set as default in response to the operation code OPCD. For example, when the offset is set in a step voltage for increasing a program voltage, the voltage generator 120 may stepwisely increase the program voltage according to the step voltage to which the set offset is applied. The voltage generator 120 may set the offset in a start program voltage and may generate and output the program voltage in which the offset is set. When the offset is set in an erase operation, the voltage generator 120 may generate and output an erase voltage in which the offset is set.

The row decoder 130 may be connected to the voltage generator 120 through global lines and may be connected to the first to jth memory blocks BLK1 to BLKj through the drain select lines DSL, the word lines WL, the source select lines SSL, and the source line SL. The row decoder 130 may be configured to transmit the operating voltages Vop to the drain select lines DSL, the word lines WL, the source select lines SSL, and the source line SL, which are connected to a selected memory block, according to a row address RADD.

The page buffer group 140 may include page buffers (not shown) commonly connected to the first to jth memory blocks BLK1 to BLKj. For example, each of the page buffers (not shown) may be connected to the first to jth memory blocks BLK1 to BLKj through bit lines BL. The page buffers (not shown) may sense a current or voltage of the bit lines BL in response to page buffer control signals PBSIG.

The column decoder 150 may be configured to transmit data between the page buffer group 140 and the input/output circuit 160 in response to a column address CADD. For example, the column decoder 150 may be connected to the page buffer group 140 through column lines CL and may apply enable signals to the column lines, thereby allowing data to be transmitted between the page buffers (not shown) included in the page buffer group 140 and the input/output circuit 160.

The input/output circuit 160 may be configured to receive or output a command CMD, an address ADD, or data through input/output lines I/O. For example, the input/output circuit 160 may transmit, to the control circuit 180, a command CMD and an address ADD, which are received from an external controller, through the input/output lines I/O, and transmit data received from the external controller to the column decoder 150 through the input/output lines I/O. The input/output circuit 160 may output data transferred from the page buffer group 140 to the external controller through the input/output lines I/O or may transfer data received from the external controller to the page buffer group 140 through data lines DL.

The control circuit 180 may include hardware configured to output an operation code OPCD, the row address RADD, the page buffer control signals PBSIG, and the column address CADD in response to the command CMD and the address ADD, and software for executing various algorithms. When the command CMD that is input to the control circuit 180 is a command corresponding to a program operation, the control circuit 180 may control the peripheral circuit 170 to perform the program operation of a memory block that is selected by the address ADD by executing a program algorithm. When the command CMD that is input to the control circuit 180 is a command corresponding to a read operation, the control circuit 180 may control the peripheral circuit 170 to perform the read operation of the memory block by executing a read algorithm and to output read data. When the command CMD input to the control circuit 180 is a command corresponding to an erase operation, the control circuit 180 may control the peripheral circuit 170 to perform the erase operation of the selected memory block by executing an erase algorithm.

The control circuit 180 may count a program number, an erase number, or a cycling number of sub-blocks included in each of the first to jth memory blocks BLK1 to BLKj and may output an operation code OPCD such that an offset is set in voltages that are used for a program or erase operation according to the counted number. The cycling number means the number of times the program or erase operation is performed. For example, when first and second sub-blocks are sequentially programmed in different manners or when the first and second sub-blocks are programmed and then erased, the control circuit 180 may control the peripheral circuit 170 to perform a compensation operation on the first sub-block according to a cycling number or program number of the second sub-block. The compensation operation may be performed to compensate for a threshold voltage of memory cells of the first sub-block, which is changed by a program or erase operation of the second sub-block. In other words, when the threshold voltage of the memory cells of the first sub-block is changed due to an operation that is performed in the second sub-block, the control circuit 180 may control the peripheral circuit 170 to perform a re-program or re-erase operation on the first sub-block. In a re-program or re-erase operation, the control circuit 180 may set an offset in a voltage that is used for the re-program or re-erase operation. For example, the control circuit 180 may set the offset in a step voltage that is used for the re-program operation, set the offset in a start program voltage, or set the offset in an erase operation used for an erase operation. That is, the control circuit 180 may output an operation code OPCD such that the offset is set in the step voltage, the start program voltage, or the erase voltage, and the voltage generator 120 may output voltages in which the offset is set in response to the operation code OPCD.

FIG. 2 is a circuit diagram illustrating any one memory block among the memory blocks shown in FIG. 1.

Referring to FIG. 2, the first to jth memory blocks BLK1 to BLKj, shown in FIG. 1, may be configured identically to one another, and therefore, the first memory block BLK1, among the first to jth memory blocks BLK1 to BLKj, is illustrated as an example.

The first memory block BLK1 may include strings that are connected between first to mth bit lines BL1 to BLm and a source line SL. A string ST that is connected to the mth bit line BLm will be described as an example. The string ST may include a source select transistor SST, first to nth memory cells M1 to Mn, and a drain select transistor DST. The first memory block BLK1, shown in FIG. 2, is a diagram schematically illustrating a structure of the memory block, and therefore, the number of the source select transistor SST, the first to nth memory cells M1 to Mn, and the drain select transistor DST, which are included in the string ST, may be changed according to a memory device. Although not shown in the drawing, dummy cells for improving electrical characteristics of memory cells may be further include in the strings ST. The dummy cells may store dummy data instead of normal data.

Gates of source select transistors SST included in different strings ST may be connected to a source select line SSL, and gate of drain select transistors SST included in the different strings ST may be connected to a drain select line DSL.

Memory cells that are formed in the same layer, among the first to nth memory cells M1 to Mn, may be connected to the same word line. For example, first memory cells M1 included in different strings ST may be commonly connected to a first word line WL1, and nth memory cells Mn included in the different strings ST may be commonly connected to an nth word line WLn. A group of memory cells, which are included in different strings ST and are connected to the same word line, may constitute a page PG. A program or read operation may be performed in units of pages PG.

A program operation will be described as an example. A program voltage may be applied to a selected word line, and a pass voltage may be applied to unselected word lines. A turn-on voltage may be applied to a drain select line Sel_DSL and a selected source line Sel_SSL. Program loops may be performed in a program operation of a selected page. Each of the program loops may include a program voltage apply step and a verify step. The program loops may be performed until threshold voltages of selected memory cells included in the selected page reach a target level, and the program voltage may be increased by a step voltage whenever each program loop is performed.

FIG. 3 is a diagram illustrating a memory block including sub-blocks. FIGS. 4A to 4C are diagrams illustrating threshold voltage distributions of memory cells programmed in different manners.

Referring to FIG. 3, a first memory block BLK1 may include first to kth sub-blocks SB1 to SBk. The first to kth sub-blocks SB1 to SBk may be distinguished from each other according to word lines. For example, memory cells that are connected to first to third word lines WL1 to WL3 may be included in the first sub-block SB1, and memory cells that are connected to fourth to sixth word lines WL4 to WL6 may be included in the second sub-block SB2. A program operation may be performed in different manners in each of the first to kth sub-blocks SB1 to SBk. Program operations of various manners will be described as follows.

Referring to FIGS. 3 and 4A, in a single level cell (SLC) manner in which one-bit data is stored in one memory cell, memory cells may be sorted into an erase state ER or a program state PV. For example, selected memory cells, among memory cells included in a selected page, may be programmed to the program state PV, and unselected memory cells, among the memory cells, may be maintained in the erase state ER.

Referring to FIGS. 3 and 4B, in a triple level cell (TLC) manner in which three-bit data is stored in one memory cell, memory cells may be sorted into an erase state ER or any one state among first to seventh program states PV1 to PV7. For example, selected memory cells, among memory cells included in a selected page, may be programmed to any one of the first to seventh program states PV1 to PV7, and unselected memory cells, among the memory cells, may be maintained in the erase state ER.

Referring to FIGS. 3 and 4C, in a quad level cell (QLC) manner in which four-bit data is stored in one memory cell, memory cells may be sorted into an erase state ER or any one state among first to fifteenth program states PV1 to PV15. For example, selected memory cells, among memory cells included in a selected page, may be programmed to any one of the first to fifteenth program states PV1 to PV15, and unselected memory cells, among the memory cells, may be maintained in the erase state ER.

As the number of bits of data stored in one memory cell increases, the number of times a program loop is performed in the program operation increases. Hence, the time taken in the program operation may increase, and reliability may be lowered. However, as the number of bits of data stored in one memory cell increases, the capacity of data stored in a sub-block may increase. Therefore, by considering features of program manners, program operations of different manners may be performed in the first to kth sub-blocks SB1 to SBk. States of memory cells programmed in the program operations of different manners are different from each other, and therefore, voltages that are used for the program operations may also be different from each other.

FIG. 5 is a flowchart illustrating an operating method of the memory device in accordance with a first embodiment of the present disclosure.

Referring to FIG. 5, program and erase operations of first to third sub-blocks may be performed by the peripheral circuit (170 shown in FIG. 1), and the peripheral circuit 170 may be controlled by the control circuit (180 shown in FIG. 1).

Among the first to third sub-blocks included in a selected memory block, the first sub-block may be programmed and erased in a first manner (S51). The first manner may be any one of the SLC, MLC, TLC, and QLC manners. However, in addition to these manners, the first manner may be any one of various program manners. Until the first sub-block is programmed and then erased in the first manner, a program operation or an erase operation in the first manner may be performed in a sub-block of another memory block. The program operation that is performed in the first sub-block may be performed in the first sub-block, among the first to third sub-blocks, and the erase operation that is performed in the first sub-block may also be performed in the first sub-block, among the first to third sub-blocks.

After the first sub-block is erased in step S51, the second sub-block may be programmed and erased in a second manner (S52). The second manner is different from the first manner. The second manner may be any one of the SLC, MLC, TLC, and QLC manners. However, in addition to these manners, the second manner may be any one of various program manners. Until the second sub-block is programmed and then erased in the second manner, a program operation or an erase operation in the second manner may be performed in a sub-block of another memory block. The program operation that is performed in the second sub-block may be performed in the second sub-block, among the first to third sub-blocks, and the erase operation that is performed in the second sub-block may also be performed in the second sub-block, among the first to third sub-blocks. When the program operation and the erase operation are performed in the second sub-block, a cycling number Ncyc of the second sub-block may increase by 1.

When the cycling number Ncyc of the second sub-block increases, the control circuit 180 may compare the cycling number Ncyc and a reference number Nref with each other (S53). The reference number Nref may be a value that is pre-stored in the control circuit 180 and may be set as another value according to a memory device. The control circuit 180 may determine whether the cycling number Ncyc is equal to or greater than the reference number Nref and may re-perform step S52 when the cycling number Ncyc is smaller than the reference number Nref (NO). In step S53, when the cycling number of the second sub-block is equal to or greater than the reference number Nref (YES), the control circuit 180 may perform, in the first sub-block, a compensation operation COP that compensates for a threshold voltage of memory cells included in the first sub-block.

The compensation operation COP will be described in detail as follows.

The control circuit 180 may set an offset in the program and erase operations of the first sub-block (S54). For example, the control circuit 180 may set the offset in a step voltage of the program operation that is performed in the first sub-block. The step voltage means a voltage difference between program voltages increasing according to a program loop. The offset in the compensation operation COP may be set to a voltage at which the step voltage increases. Also, the control circuit 180 may set the offset in an erase voltage of the erase operation that is performed in the first sub-block. The control circuit 180 may set the offset even in a start program voltage of the program operation that is performed in the first sub-block. That is, the offset may be set in each of the start program voltage and the step voltage. The offset that is set in the erase operation may also be set to a voltage at which the erase voltage is increased.

When the offset of the program operation and the erase operation is set, the control circuit 180 may re-program and re-erase the first sub-block in the first manner by using voltages in which the offset is set (S55). In order to perform a re-program operation in the first manner, the control circuit 180 may again request for data performed in the first sub-block from an external controller or request dummy data. When the first sub-block is re-programmed in the first manner, the control circuit 180 may perform a re-erase operation of the first sub-block. The re-erase operation may be performed in the same manner, regardless of program manners.

When the re-erase operation is performed, a re-erase verify operation may be performed (S56). That is, the threshold voltage of the memory cells in an erase state, which are included in the first sub-block, may be increased by the program and erase operations that are performed in the second sub-block in step S52, and therefore, a verify operation on the re-erase operation that is performed in step S55 may be performed in step S56.

When the re-erase operation fails (FAIL), the control circuit 180 may repeat steps S54 to S56 until the re-erase verify operation of the first sub-block passes (PASS).

When the re-erase verify operation passes (PASS), the control circuit 180 may perform program and erase operations of the third sub-block (S57). The program and erase operations may be performed in a third manner in the third sub-block. The third manner may be different from the first and second manners. For example, the third manner may be any one of the SLC, MLC, TLC, and QLC manners. However, in addition to these manners, the third manner may be any one of various program manners. Until the third sub-bock is programmed and then erased in the third manner, the program operation or the erase operation of the third manner may be performed in a sub-block of another memory block. The program operation that is performed in the third sub-block may be performed in the third sub-block among the first to third sub-blocks, and the erase operation that is performed in the third sub-block may also be performed in the third sub-block, among the first to third sub-blocks.

States of the first to third sub-blocks in which program and erase operations are performed in accordance with a first embodiment of the present disclosure will be described as follows.

FIGS. 6A to 6D are diagrams illustrating sub-blocks programmed or erased in accordance with the first embodiment of the present disclosure.

Figure 6A:
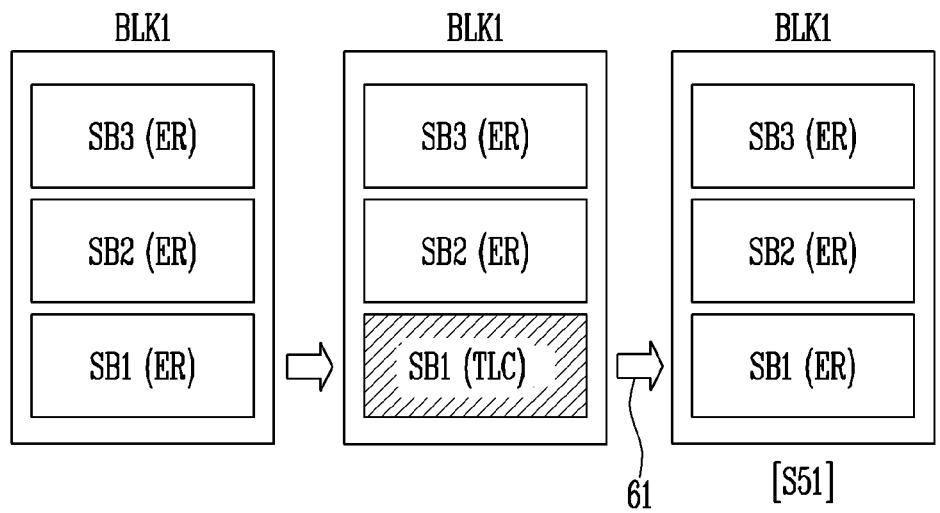

Referring to FIGS. 5 and 6A, before step S51 is performed, the first to third sub-blocks SB1 to SB3, included in the first block BLK1, may be in the erase state ER. In step S51, the first sub-block SB1 included in the first memory block BLK1 may be programmed according to the first manner. For example, the first sub-block SB1 may be programmed in the TLC manner. After the first sub-block SB1 is programmed, a read operation of the first sub-block SB1 may be performed, or a program, read, or erase operation may be performed in another memory block in addition to the first memory block BLK1. When an erase operation is performed in the first sub-block SB1, one cycle of the first sub-block SB1 may be ended.

Figure 6B:
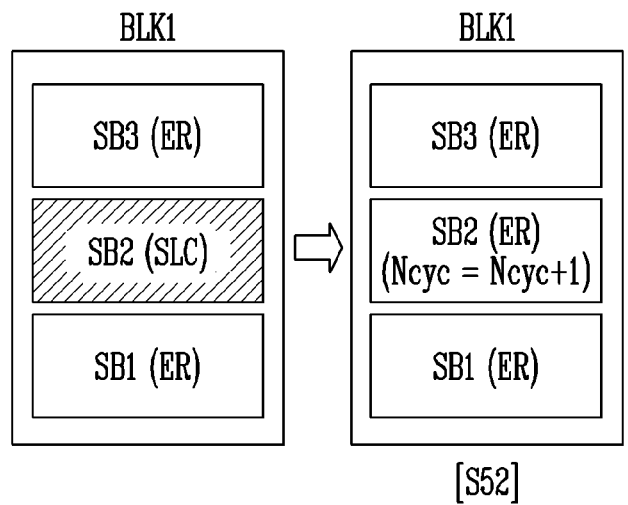

Referring to FIGS. 5 and 6B, after the cycle of the first sub-block SB1 is ended, a cycle of the second sub-block SB2 may be performed in step S52. The second sub-block SB2 may be programmed according to the second manner that is different from the first manner in which the first sub-block SB1 is programmed. For example, the second manner may be the SLC manner. After the second sub-block SB2 is programmed, a read operation of the second sub-block SB2 may be performed, or a program, read, or erase operation may be performed in another memory block in addition to the first memory block BLK1. When an erase operation is performed on the second sub-block SB2, one cycle of the second sub-block SB2 may be ended. Therefore, a cycling number Ncyc of the second sub-block SB2 may have a value that has increased by 1 from a previous cycling number Ncyc.

Figure 6C:
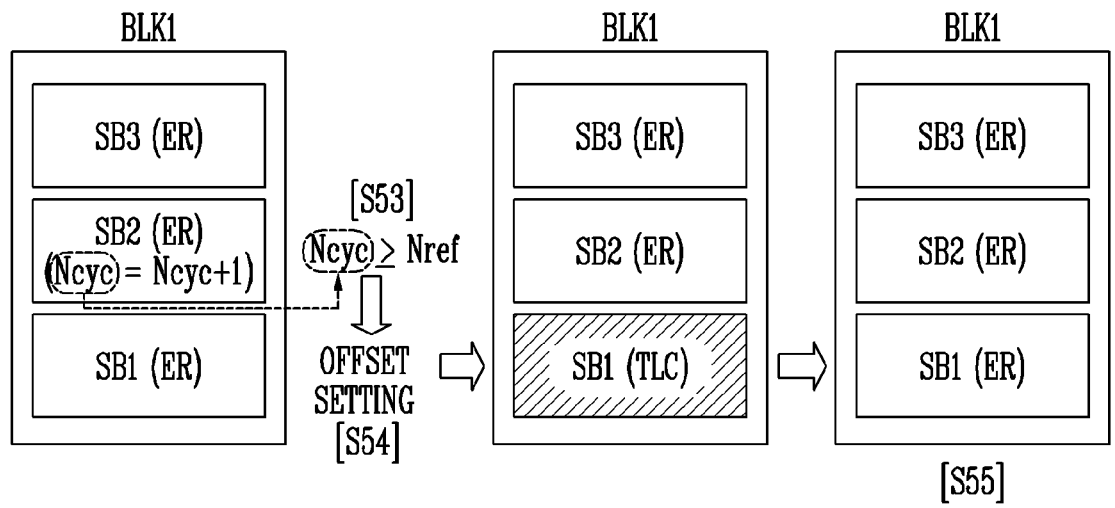

Referring to FIGS. 5 and 6C, as the cycling number of the second sub-block SB2 increases, a threshold voltage of memory cells included in the first sub-block SB1, adjacent to the second sub-block SB2, may be changed. For example, the cycling number of the second sub-block SB2 increasing means that the number of times the program and erase operations are performed in the second sub-block SB2 increases, and therefore, the first sub-block SB1, which is adjacent to the second sub-block SB2, may be influenced. Since the memory cells included in the first memory block SB1 are in the erase state ER, the threshold voltage of the memory cells included in the first sub-block SB1 may be increased as the cycling number Ncyc of the second sub-block SB2 increases. Therefore, in step S53, an operation of determining whether the threshold voltage of the memory cells included in the first sub-block SB1 require compensation may be performed. For example, it may be determined whether the cycling number Ncyc of the second sub-block SB2 is equal to or greater than the reference number Nref.

When the cycling number Ncyc of the second sub-block SB2 is equal to or greater than the reference number Nref, a compensation operation that compensates for the threshold voltage of the memory cells included in the first sub-block SB1 may be performed.

When the compensation operation is started, some conditions of program and erase operations to be performed in the first sub-block SB1 may be changed. For example, an offset may be set in a step voltage corresponding to a voltage difference in program voltage that is increased according to a program loop, an offset may be set in a start program voltage, and an offset may be set in an erase voltage (S54). The offset may be set to a positive voltage. Therefore, when the offset is set in a step voltage having a default level, the step voltage may be increased. When the step voltage of the program operation that is performed in step S55 is increased, a program voltage may be increased more rapidly than the program voltage of step S51. Therefore, a time taken in the program operation that is performed in step S55 may become shorter than a time taken in the program operation that is performed in step S51. When the offset is set in each of the start program voltage and the step voltage, the time taken in the program operation may be further shortened. The program operation that is performed in the first sub-block SB1 in step S55 may be performed according to the first manner. A purpose of the program operation that is performed in step S55 might not be to store specific data in the first sub-block SB1 but to return the threshold of the memory cells to a normal threshold voltage. Therefore, dummy data may be stored in the first sub-block SB1 in the program operation. When the existing data stored in the first sub-block SB1 is stored in a controller that is connected to the memory device, but outside of the memory device, the existing data, instead of the dummy data, may be stored in the first sub-block SB1. When a program operation in which the offset is set is performed in the first sub-block SB1 according to the first manner, an erase operation using the erase voltage in which the offset is set may be performed in the first sub-block SB1. When the compensation operation COP including the program and erase operations is performed in the first sub-block SB1, the threshold voltage of the memory cells in the erase state ER, which are included in the first sub-block SB1, may be again decreased.

Figure 6D:
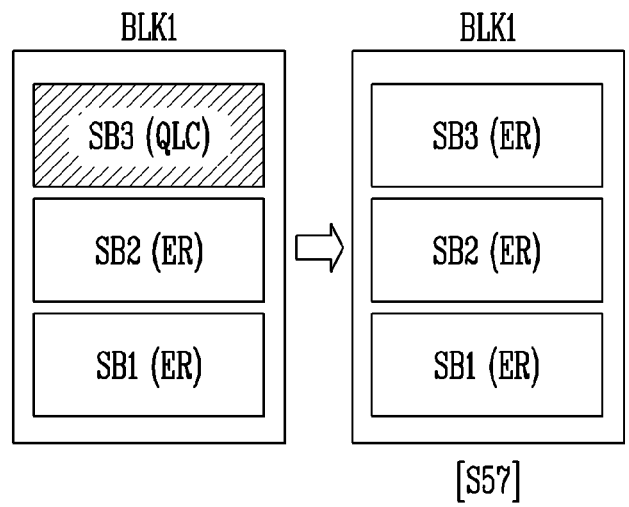

Referring to FIGS. 5 and 6D, when the compensation operation COP of the first sub-block SB1 is ended, a cycle of the third sub-block SB3 may be performed (S57). The third sub-block SB3 may be programmed according to the third manner. For example, the third manner may be the QLC manner. After the third sub-block SB3 is programmed, a read operation of the third sub-block SB3 may be performed, or a program, read or erase operation may be performed in another memory block in addition to the first memory block BLK1. When an erase operation is performed in the third sub-block SB3, one cycle of the third sub-block SB3 is ended.

FIG. 7A to 7C are diagram illustrating program voltages before and after an offset is set.

Referring to FIGS. 5 and 7A, a program voltage and a step voltage, which are set as default, may be used for the program operation that is performed in step S51. For example, a start program voltage ST_Vpgm and a first step voltage 1Vst may be set to a default level set in manufacturing of the memory device. Therefore, a first program voltage 1Vpgm that is used in a first program loop 1LP may be the start program voltage ST_Vpgm. A second program voltage 2Vpgm that is higher than the first program voltage 1Vpgm by the first step voltage 1Vst may be used in a second program loop 2LP. In this manner, the other program loops may be performed.

Referring to FIGS. 5 and 7B, a second step voltage 2Vst in which a start program voltage ST_Vpgam and an offset OFS, which are set as default, are set may be used for the program operation of step S55, which is performed in the compensation operation. That is, the second step voltage 2Vst may be set as a voltage that is higher than the first step voltage 1Vst by the offset OFS. Therefore, a first program voltage 1Vpgm that is used in a first program loop 1LP may be the start program voltage ST_Vpgm. A second program voltage Vpgm higher than the first program voltage 1Vpgm by the second step voltage 2Vst may be used in a second program loop 2LP. In this manner, the other program loops may be performed.

Referring to FIGS. 5 and 7C, a start program voltage ST_Vpgm' in which an offset is set and a second step voltage 2Vst in which the offset is set may be used for the program operation of step S55, which is performed in the compensation operation. Therefore, a first program voltage 1Vpgm that is used in a first program loop 1LP may be the start program voltage ST_Vpgm' in which the offset is set. A second program voltage 2Vpgm higher than the first program voltage 1Vpgm by the second step voltage 2Vst may be used in a second program loop 2LP. In this manner, the other program loops may be performed.

FIGS. 8A and 8B are diagram illustrating erase voltages before and after an offset is set.

Referring to FIGS. 5 and 8A, an erase voltage set as default may be used for the erase operation that is performed in step S51. For example, a first erase voltage 1Vers having a default level set in manufacturing of the memory device may be used.

Referring to FIGS. 5 and 8B, a second erase voltage 2Vers in which an offset OFS is set may be used for the erase operation of step S55, which is performed in the compensation operation. That is, the second erase voltage 2Vers may be set as a voltage that is higher than the first erase voltage 1Vers by the offset OFS.

FIG. 9 is a diagram illustrating an effect in accordance with the first embodiment of the present disclosure.

Referring to FIG. 9, when the cycling number of the second sub-block increases after the first sub-block is programmed and erased in the first manner, the threshold voltage of the memory cells in the erase state ER, which are included in the first sub-block, may be increased (91). When the threshold voltage of the memory cells in the erase state ER is increased (91), the number of memory cells that are over-programmed in the program operation may increase, and therefore, threshold voltage distributions of memory cells, which are to be maintained in different program states, may overlap with each other. An error may occur in the read operation. In order to prevent such an error from occurring, a compensation operation may be performed in the first sub-block according to the cycling number of the second sub-block in the above-described first embodiment. In the compensation operation, the first sub-block may be re-programmed and re-erased, and therefore, the threshold voltage of the memory cells included in the first sub-block may be recovered to a normal erase state (92).

FIG. 10 is a flowchart illustrating an operating method of the memory device in accordance with a second embodiment of the present disclosure.

Referring to FIG. 10, in the second embodiment of the present disclosure, a compensation operation COP may be performed even when no erase operation is performed in the sub-blocks.

A program operation of first to third sub-blocks may be performed by the peripheral circuit (170 shown in FIG. 1), and the peripheral circuit 170 may be controlled by the control circuit (180 shown in FIG. 1).

Among the first to third sub-blocks included in a selected memory block, the first sub-block may be programmed in a first manner (S101). The first manner may be any one of the SLC, MLC, TLC, and QLC manners. However, in addition to these manners, the first manner may be any one of various program manners.

After the first sub-block is programmed in step S101, the second sub-block may be programmed in a second manner (S102). The second manner may be different from the first manner. The second manner may be any one of the SLC, MLC, TLC, and QLC manners. However, in addition to these manners, the second manner may be any one of various program manners. When a program operation is performed in the second sub-block, a program number Npgm of the second sub-block may increase by 1.

When the program number Npgm of the second sub-block increases, the control circuit 180 may compare the program number Npgm and a reference number Nref with each other (S103). The reference number Nref may be different from the reference number Nref, described with reference to FIG. 5. The reference number Nref may be a value that is pre-stored in the control circuit 180 and may be set to another value according to a memory device. The control circuit 180 may determine whether the program number Npgm of the second sub-block is equal to or greater than the reference number Nref and may re-perform step S102 when the program number Npgm is smaller than the reference number Nref (NO). In step S103, when the program number Npgm of the second sub-block is equal to or greater than the reference number Nref (YES), the control circuit 180 may perform, in the first sub-block, the compensation operation COP that compensates for a threshold voltage of memory cells included in the first sub-block.

The compensation operation COP will be described in detail as follows.

The control circuit 180 may set an offset in erase and program operation of the first sub-block (S104). For example, the control circuit 180 may set the offset in an erase operation to be performed in the first sub-block. The offset that is set in the erase operation may be set to a voltage at which an erase voltage increases. The control circuit 180 may set the offset in a step voltage of a program operation to be performed in the first sub-block. In the compensation operation COP, the offset may be set to a voltage at which the step voltage increases. The control circuit 180 may set the offset even in a start program voltage of the program operation to be performed in the first sub-block. That is, the offset may be set in each of the start program voltage and the step voltage.

When the offset of the erase and program operations is set, the control circuit 180 may re-erase the first sub-block and then re-program the first sub-block by using voltages in which the offset is set (S105). Re-erase and re-program operations may be performed in the first manner. In order to perform the re-program operation, the control circuit 180 may again request data performed in the first sub-block from an external controller.

When the re-program operation is performed, a re-program verify operation may be performed (S106). That is, the threshold voltage of the memory cells included in the first sub-block may be increased by the program operation that is performed in the second sub-block in step 102, and therefore, a verify operation on the re-program operation that is performed in step S105 may be performed in step S106.

When the re-program verify operation fails (FAIL), the control circuit 180 may repeat steps S104 to S106 until the re-program verify operation of the first sub-block passes.

When the re-program verify operation passes (PASS), the control circuit 180 may perform a program operation of the third sub-block (S107). The program operation may be performed in a third manner in the third sub-block. The third manner may be different from the first and second manners. For example, the third manner may be any one of the SLC, MLC, TLC, and QLC manners. However, in addition to these manners, the third manner may be any one of various program manners.

FIG. 11 is a diagram illustrating an effect in accordance with the second embodiment of the present disclosure.

Referring to FIG. 11, when the program number of the second sub-block increases after the first sub-block is programmed in the first manner, a threshold voltage of memory cells in one of program states PV1 to PV7 may be increased in the first sub-block (111). When the threshold voltage of the memory cells in the one of the program states PV1 to PV7 increases (111), the number of memory cells of which threshold voltage is not sufficiently decreased in an erase operation that is performed subsequently may increase, and the threshold voltage of the memory cells may be increased in a program operation to be subsequently performed. Therefore, an error may occur in a read operation. In order to prevent such an error from occurring, a compensation operation may be performed in the first sub-block according to the program number of the second sub-block in the above-described second embodiment. In the compensation operation, the first sub-block may be re-erased and re-programmed, and therefore, the threshold voltage of the memory cells included in the first sub-block may be recovered to a normal erase state (112).

FIG. 12 is a flowchart illustrating an operating method of the memory device in accordance with a third embodiment of the present disclosure.

Referring to FIG. 12, a compensation operation COP might not be limited by a program manner performed in first to third sub-blocks. Therefore, in the third embodiment of the present disclosure, the first sub-block SB1 may be programmed in the SLC manner, and the second sub-block SB2 may be programmed in the TLC manner (S121). When a cycling number or program number of the second sub-block SB2 is equal to or greater than a reference number, the compensation operation COP may be performed in the first sub-block SB1 (S122). In the compensation operation COP, program and erase operation using voltages in which an offset is set may be performed. In the compensation operation COP, a program operation that is performed in the first sub-block SB1 may also be performed in the SLC manner.

When the compensation operation COP of the first sub-block SB1 is ended, a program operation of the third sub-block SB3 may be performed (S123). The program operation that is performed in the third sub-block SB3 may be performed in the QLC manner.

FIG. 13 is a flowchart illustrating an operating method of the memory device in accordance with a fourth embodiment of the present disclosure.

Referring to FIG. 13, in the fourth embodiment of the present disclosure, the first sub-block SB1 may be programmed in the TLC manner, and the second sub-block SB2 may be programmed in the SLC manner (S131). When a cycling number or program number of the second sub-block SB2 is equal to or greater than a reference number, a compensation operation COP may be performed in the first sub-block SB1 (S132). In the compensation operation COP, program and erase operations using voltages in which an offset is set may be performed. In the compensation operation COP, a program operation that is performed in the first sub-block SB1 may also be performed in the TLC manner.

When the compensation operation COP of the first sub-block SB1 is ended, a program operation of the third sub-block SB3 may be performed (S133). The program operation that is performed in the third sub-block SB3 may be performed in the QLC manner.

FIG. 14 is a flowchart illustrating an operating method of the memory device in accordance with a fifth embodiment of the present disclosure.

Referring to FIG. 14, in the fifth embodiment of the present disclosure, the first sub-block SB1 may be programmed in the QLC manner, and the second sub-block SB2 may be programmed in the SLC manner (S141). When a cycling number or program number of the second sub-block SB2 is equal to or greater than a reference number, a compensation operation COP may be performed in the first sub-block SB1 (S142). In the compensation operation COP, program and erase operations using voltages in which an offset is set may be performed. In the compensation operation COP, a program operation that is performed in the first sub-block SB1 may also be performed in the QLC manner.

When the compensation operation COP of the first sub-block SB1 is ended, a program operation of the third sub-block SB3 may be performed (S143). The program operation that is performed in the third sub-block SB3 may be performed in the TLC manner.

FIG. 15 is a flowchart illustrating an operating method of the memory device in accordance with a sixth embodiment of the present disclosure.

Referring to FIG. 15, in the sixth embodiment of the present disclosure, the first sub-block SB1 may be programmed in the QLC manner, and the second sub-block SB2 may be programmed in the TLC manner (S151). When a cycling number or program number of the second sub-block SB2 is equal to or greater than a reference number, a compensation operation COP may be performed in the first sub-block SB1 (S152). In the compensation operation COP, program and erase operations using voltages in which an offset is set may be performed. In the compensation operation COP, a program operation that is performed in the first sub-block SB1 may also be performed in the QLC manner.

When the compensation operation COP of the first sub-block SB1 is ended, a program operation of the third sub-block SB3 may be performed (S153). The program operation that is performed in the third sub-block SB3 may be performed in the SLC manner.

FIG. 16 is a diagram illustrating a memory card system to which the memory device of the present disclosure is applied.

Referring to FIG. 16, the memory card system 3000 includes a controller 3100, a memory device 3200, and a connector 3300.

The controller 3100 may be connected to the memory device 3200. The controller 3100 may access the memory device 3200. For example, the controller 3100 may control a program, read, or ease operation, or control a background operation of the memory device 3200. The controller 3100 may provide an interface between the memory device 3200 and a host. The controller 3100 may drive firmware for controlling the memory device 3200. For example, the controller 3100 may include components, such as a Random Access Memory (RAM), a processing unit, a host interface, a memory interface, and the error corrector.

The controller 3100 may communicate with an external device through the connector 3300. The controller 3100 may communicate with the external device (e.g., the host) according to a specific communication protocol. Exemplarily, the controller 3100 may communicate with the external device through at least one of various communication protocols such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe. Exemplarily, the connector 3300 may be defined by at least one of the above-described various communication protocols.

The memory device 3200 may include memory cells and may be configured identically to the memory device 100, shown in FIG. 1. Therefore, the memory device 3200 may adjust pass voltages that are applied to unselected word lines in a read operation as described in the above-described embodiments.

The controller 3100 and the memory device 3200 may be integrated into a single semiconductor device, to constitute a memory card. For example, the controller 3100 and the memory device 3200 may constitute a memory card, such as a personal computer (PC) card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and a Universal Flash Storage (UFS).

FIG. 17 is a diagram illustrating a Solid State Drive (SSD) system to which the memory device of the present disclosure is applied.

Referring to FIG. 17, the SSD system 4000 includes a host 4100 and an SSD 4200. The SSD 4200 may exchange a signal with the host 4100 through a signal connector 4001 and may receive power through a power connector 4002. The SSD 4200 may include a controller 4210, a plurality of memory devices 4221 to 422n, an auxiliary power supply 4230, and a buffer memory 4240.

The controller 4210 may control the plurality of memory devices 4221 to 422n in response to a signal that is received from the host 4100. Exemplarily, the signal may be a signal based on an interface between the host 4100 and the SSD 4200. For example, the signal may be a signal defined by at least one of interfaces, such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The plurality of memory devices 4221 to 422n may include a plurality of memory cells configured to store data. Each of the plurality of memory devices 4221 to 422n may be configured identically to the memory device 100, shown in FIG. 1. Therefore, each of the plurality of memory devices 4221 to 422n may adjust pass voltages that are applied to unselected word lines in a read operation as described in the above-described embodiments. The plurality of memory devices 4221 to 422n may communicate with the controller 4210 through channels CH1 to CHn.

The auxiliary power supply 4230 may be connected to the host 4100 through the power connector 4002. The auxiliary power supply 4230 may receive power PWR that is input from the host 4100 and charge the power PWR. When the supply of power from the host 4100 is not smooth, the auxiliary power supply 4230 may provide power of the SSD 4200. Exemplarily, the auxiliary power supply 4230 may be located in the SSD 4200 or may be located at the outside of the SSD 4200. For example, the auxiliary power supply 4230 may be located on a main board and may provide auxiliary power to the SSD 4200.

The buffer memory 4240 may operate as a buffer memory of the SSD 4200. For example, the buffer memory 4240 may temporarily store data received from the host 4100 or data received from the plurality of memory devices 4221 to 422n, or temporarily store meta data (e.g., a mapping table) of the memory devices 4221 to 422n. The buffer memory 4240 may include volatile memories, such as a DRAM, an SDRAM, a DDR SDRAM, an LPDDR SDRAM, and a GRAM or nonvolatile memories such as a FRAM, a ReRAM, an STT-MRAM, and a PRAM.

In accordance with the present disclosure, the reliability of the memory device including a memory block configured with sub-blocks can be improved.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made based on the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made based on the technological scope of the present disclosure in addition to the embodiments disclosed herein.

What is claimed is:

1. A memory device comprising:
    a memory block including a plurality of sub-blocks;
    a peripheral circuit configured to perform a first program operation in a first manner in a first sub-block, among the plurality of sub-blocks, and configured to perform a second program operation in a second manner in a second sub-block, among the plurality of sub-blocks; and
    a control circuit configured to, when a program number of the second program operation that is performed in the second sub-block is equal to or greater than a reference number, control the peripheral circuit to perform a compensation operation that compensates for threshold voltages of memory cells included in the first sub-block.

2. The memory device of claim 1, wherein the peripheral circuit performs the first program operation in the first manner in the first sub-block and then performs the second program operation in the second manner in the second sub-block.

3. The memory device of claim 1, wherein, when the program number is equal to or greater than the reference number, the control circuit sets an offset in each of a re-erase operation and a re-program operation, which are to be performed in the compensation operation.

4. The memory device of claim 3, wherein the control circuit controls the peripheral circuit to increase an erase voltage to be used for the re-erase operation by setting the offset in the erase voltage.

5. The memory device of claim 3, wherein the control circuit controls the peripheral circuit to increase a start program voltage to be used for the re-program operation by setting the offset in the start program voltage.

6. The memory device of claim 3, wherein the control circuit controls the peripheral circuit to increase a step voltage corresponding to a voltage difference between program voltages that are used for the re-program operation by setting the offset in the step voltage.

7. The memory device of claim 3, wherein the control circuit controls the peripheral circuit to continuously perform the re-program operation after the re-erase operation is performed.

8. The memory device of claim 1, wherein, when the program number is less than the reference number, the control circuit controls the peripheral circuit to perform the second program operation and a second erase operation in the second sub-block until the program number becomes equal to or greater than the reference number.

9. The memory device of claim 1, wherein the first and second manners are different program manners.

10. The memory device of claim 1, wherein the control circuit controls the peripheral circuit to perform a third program operation in a third manner in a third sub-block, among the plurality of sub-blocks, when the compensation operation of the first sub-block is completed.

11. The memory device of claim 10, wherein the third manner is a program manner different from the first and second manners.

12. The memory device of claim 11, wherein the first to third manners are selected from a single level cell (SLC) manner, a multi-level cell (MLC) manner, a triple level cell (TLC) manner, and a quad level cell (QLC) manner.

13. A method of operating a memory device, the method comprising:
    performing a first program operation in a first manner in a first sub-block included in a memory block;
    performing a second program operation in a second manner in a second sub-block included in the memory block;
    comparing a program number of the second program operation that is performed in the second sub-block with a reference number; and
    performing a compensation operation that compensates for a threshold voltage of memory cells included in the first sub-block when the program number is equal to or greater than the reference number.

14. The method of claim 13, wherein the first and second manners are different program manners.

15. The method of claim 13, wherein the first and second manners are selected from a single level cell (SLC) manner, a multi-level cell (MLC) manner, a triple level cell (TLC) manner, and a quad level cell (QLC) manner.

16. The method of claim 13, wherein the performing of the compensation operation includes:
    setting an offset;
    performing a re-erase operation in which the offset is set in the first sub-block; and
    performing a re-program operation in which the offset is set in the first sub-block.

17. The method of claim 16, wherein, in the setting of the offset, an erase voltage to be used for the re-erase operation is set higher than a default level.

18. The method of claim 16, wherein, in the setting of the offset, a step voltage corresponding to a voltage difference between program voltages to be used in the program operation is set higher than a default level.

19. The method of claim 16, wherein, in the setting of the offset, a start program voltage to be used for the program operation is set higher than a default level.

20. The method of claim 13, wherein, when the program number is less than the reference number, the second program operation and a second erase operation are performed in the second sub-block until the program number becomes equal to or greater than the reference number.

21. The method of claim 13, wherein, which the compensation operation of the first sub-block is completed, a program operation is performed in a third manner in a third sub-block included in the memory block.

22. The method of claim 21, wherein the third manner is a program manner different from the first and second manners.

* * * * *